US007608325B2

(12) United States Patent
Rasch et al.

(10) Patent No.: US 7,608,325 B2
(45) Date of Patent: Oct. 27, 2009

(54) FUSER MEMBER HAVING CONDUCTIVE FLUOROCARBON OUTER LAYER

(75) Inventors: Kenneth R. Rasch, Fairport, NY (US); Santokh S. Badesha, Pittsford, NY (US)

(73) Assignee: Xerox Corporation, Norwalk, CT (US)

( * ) Notice: Subject to any disclaimer, the term of this patent is extended or adjusted under 35 U.S.C. 154(b) by 329 days.

(21) Appl. No.: 11/523,970

(22) Filed: Sep. 20, 2006

(65) Prior Publication Data

US 2008/0070031 A1 Mar. 20, 2008

(51) Int. Cl.

| | |
|---|---|
| ***B32B 25/20*** | (2006.01) |
| ***B32B 27/20*** | (2006.01) |
| ***B32B 27/28*** | (2006.01) |
| ***G03G 15/20*** | (2006.01) |

(52) U.S. Cl. ...................... 428/323; 428/422; 428/447; 399/333

(58) Field of Classification Search ...................... None
See application file for complete search history.

(56) References Cited

U.S. PATENT DOCUMENTS

| | | | | |
|---|---|---|---|---|
| 4,434,355 | A * | 2/1984 | Inagaki et al. | 219/216 |
| 6,041,210 | A | 3/2000 | Chen et al. | |
| 6,159,588 | A | 12/2000 | Eddy et al. | |
| 6,419,615 | B1 | 7/2002 | Chen et al. | |
| 6,528,572 | B1 * | 3/2003 | Patel et al. | 524/495 |
| 6,927,006 | B2 | 8/2005 | Finn et al. | |
| 2002/0132906 | A1 * | 9/2002 | Kondo et al. | 524/496 |

OTHER PUBLICATIONS

Alger, Polymer Science Dictionary, 2nd Edition, p. 365, Apr. 1999.*

* cited by examiner

*Primary Examiner*—Ramsey Zacharia
(74) *Attorney, Agent, or Firm*—MH2 Technology Law Group LLP

(57) ABSTRACT

A fuser member comprising a substrate, and thereover, an outer layer comprising perfluoroalkoxy polytetrafluoroethylene and carbon black fillers, wherein said outer layer has a volume resistivity of from about $1\times10^{-4}$ to about $1\times10^{-8}$ ohms/square.

16 Claims, 5 Drawing Sheets

FUSER MEMBER HAVING CONDUCTIVE FLUOROCARBON OUTER LAYER

BACKGROUND

The disclosure herein relates generally to an imaging apparatus and fuser components thereof for use in electrostatographic, including digital, image-on-image, and like apparatuses. The fuser components, including fuser members, pressure members, donor members, external heat member, and the like, are useful for many purposes including fixing a toner image to a copy substrate. More specifically, the disclosure relates to fuser components comprising a fluorocarbon outer layer. In embodiments, the fluorocarbon outer layer is positioned on a substrate, which may be of many configurations including a roller, belt, film, or like substrate. In other embodiments, the fluorocarbon outer layer has an outer release layer thereon. In embodiments, there is positioned between the substrate and the outer fluorocarbon layer, an intermediate and/or adhesive layer. In embodiments, the fuser member outer coating comprises carbon black filler and has a conductivity within a specific range. The fuser member may be useful in xerographic machines, such as copiers, printers, facsimiles, multifunction machines, and including color machines.

In a typical electrostatographic reproducing apparatus, a light image of an original to be copied is recorded in the form of an electrostatic latent image upon a photosensitive member and the latent image is subsequently rendered visible by the application of electroscopic thermoplastic resin particles which are commonly referred to as toner. The visible toner image is then in a loose powdered form and can be easily disturbed or destroyed. The toner image is usually fixed or fused upon a support, which may be the photosensitive member itself, or other support sheet such as plain paper.

The use of thermal energy for fixing toner images onto a support member is well known and methods include providing the application of heat and pressure substantially concurrently by various means, a roll pair maintained in pressure contact, a belt member in pressure contact with a roll, a belt member in pressure contact with a heater, and the like. Heat may be applied by heating one or both of the rolls, plate members, or belt members. With a fixing apparatus using a thin film in pressure contact with a heater, the electric power consumption is small, and the warming-up period is significantly reduced or eliminated.

It is desired in the fusing process that minimal or no offset of the toner particles from the support to the fuser member take place during normal operations. Toner particles offset onto the fuser member may subsequently transfer to other parts of the machine or onto the support in subsequent copying cycles, thus increasing the background or interfering with the material being copied there. The referred to "hot offset" occurs when the temperature of the toner is increased to a point where the toner particles liquefy and a splitting of the molten toner takes place during the fusing operation with a portion remaining on the fuser member. The hot offset temperature or degradation of the hot offset temperature is a measure of the release property of the fuser, and accordingly it is desired to provide a fusing surface, which has a low surface energy to provide the necessary release. To ensure and maintain good release properties of the fuser, it has become customary to apply release agents to the fuser roll during the fusing operation. Typically, these materials are applied as thin films of, for example, silicone oils to prevent toner offset.

Another method for reducing offset is to impart antistatic and/or field assisted toner transfer properties to the fuser. However, to control the electrical conductivity of the release layer, the conformability and low surface energy properties of the release layer are often affected.

U.S. Pat. No. 6,419,615 discloses a fuser member having an outer layer of FEP with carbon black fillers dispersed therein.

U.S. Pat. No. 6,041,210 discloses a fuser member having PTFE and PFA, along with metal oxides dispersed therein, as an overcoat.

U.S. Pat. No. 6,159,588 discloses a fuser member having PTFE as an outer layer over a silicone rubber intermediate layer. The PTFE has alumina and silica particles dispersed therein.

U.S. Pat. No. 6,927,006 discloses a fuser member having an outer layer of PFA PTFE with carbon black over a silicone rubber intermediate layer. The patent discloses polyimide particles dispersed in the fluorocarbon outer layer.

Known fuser coatings include high temperature polymers such as polytetrafluoroethylene, perfluoroalkoxy, fluorinated ethylene propylene, silicone rubber, fluorosilicone rubber, fluoroelastomers, and the like. These coatings have been found to have adequate release properties and control toner offset sufficiently. However, these coatings do not tend to stay clean during use. Further, the coatings do not maintain a uniform surface. More specifically, the coatings often wear during use and/or become scratched during operation. In addition, these known surfaces often react with the toner and/or oil and/or debris from media, which causes the surface to become dirty and/or contaminated. The surface can, in turn, become physically damaged. The result of these problems is that the fuser member has a reduced useful function and short life. Another problem resulting from release coatings with high friction is unacceptable copy or print quality defects. The high friction often associated with conformable coatings may result in the generation of waves in the media being fused and/or the fuser member itself. This, in turn, results in copies or prints with localized areas of poorer fix and/or differential gloss.

Some of the above problems have been solved by recent improvements of adding polymer fillers to outer layers. However, the use of polymer fillers has caused other problems such as stripper finger marks present on copies, which leads to failure mode. Other failure modes include an offset failure mode problem. Further, wave defects have resulted.

Other problems results in that stripper fingers and charged paper or other input media, produce charge fringe fields on the fuser member surface. These charge fields then affect the un-fused toner image that is presented on the fuser roller. This, in turn, results in various image quality defects.

Therefore, a need remains for fuser components for use in electrostatographic machines that have superior electrical properties. More specifically, a need remains to decrease or eliminate the voltage differential and subsequent copy quality defect. The subtle voltage differences produced by: contacting members, substrate widths, or speed-related edge effects, results in image disturbances that are magnified after particle coalescence. These voltages, if not dissipated, exist for an indefinite period of time. The overall dissipation scheme involves a path from the conductive fuser member to the contacting conductive pressure member that is grounded via contact devices. A further need remains for fuser coatings having reduced susceptibility to contamination, scratching, and other damage. In addition, a need remains for fuser components having longer life. In addition, a need remains for fuser components with low friction while being resistant to scratching and other damage.

SUMMARY

Embodiments include, a fuser member comprising a substrate, and thereover, an outer layer comprising perfluoroalkoxy polytetrafluoroethylene and carbon black fillers, wherein said outer layer has a volume resistivity of from about $1\times10^{-4}$ to about $1\times10^{-8}$ ohms/square.

Embodiments further include a fuser member comprising a substrate, and thereover, an intermediate layer comprising silicone rubber, and an outer layer positioned on said intermediate layer, wherein said outer layer comprises perfluoroalkoxy polytetrafluoroethylene and carbon black fillers, wherein said outer layer has a volume resistivity of from about $1\times10^{-4}$ to about $1\times10^{-8}$ ohms/square.

In addition, embodiments include an image forming apparatus for forming images on a recording medium comprising a charge-retentive surface to receive an electrostatic latent image thereon; a development component to apply toner to the charge-retentive surface to develop an electrostatic latent image to form a developed image on the charge retentive surface; a transfer film component to transfer the developed image from the charge retentive surface to a copy substrate; and a fuser member and fuser member for fusing toner images to a surface of the copy substrate, wherein said fuser member comprises a substrate, and thereover, an outer layer comprising perfluoroalkoxy polytetrafluoroethylene and carbon black fillers, wherein said outer layer has a volume resistivity of from about $1\times10^{-4}$ to about $1\times10^{-8}$ ohms/square.

BRIEF DESCRIPTION OF THE DRAWINGS

The above embodiments will become apparent as the following description proceeds upon reference to the drawings, which include the following figures.

DETAILED DESCRIPTION

Figure 1:
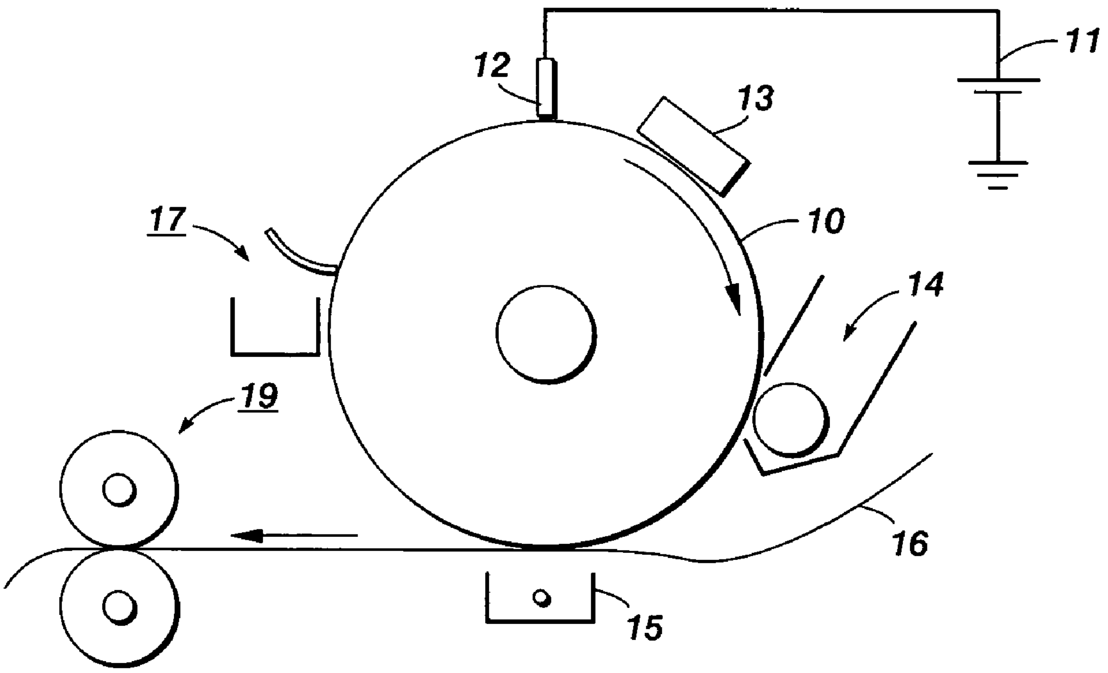
FIG. 1 is an illustration of a general electrostatographic apparatus.

Referring to FIG. 1, in a typical electrostatographic reproducing apparatus, a light image of an original to be copied is recorded in the form of an electrostatic latent image upon a photosensitive member and the latent image is subsequently rendered visible by the application of electroscopic thermoplastic resin particles which are commonly referred to as toner. Specifically, photoreceptor 10 is charged on its surface by means of a charger 12 to which a voltage has been supplied from power supply 11. The photoreceptor is then imagewise exposed to light from an optical system or an image input apparatus 13, such as a laser and light emitting diode, to form an electrostatic latent image thereon. Generally, the electrostatic latent image is developed by bringing a developer mixture from developer station 14 into contact therewith. Development can be effected by use of a magnetic brush, powder cloud, or other known development process. A dry developer mixture usually comprises carrier granules having toner particles adhering triboelectrically thereto. Toner particles are attracted from the carrier granules to the latent image forming a toner powder image thereon. Alternatively, a liquid developer material may be employed, which includes a liquid carrier having toner particles dispersed therein. The liquid developer material is advanced into contact with the electrostatic latent image and the toner particles are deposited thereon in image configuration.

After the toner particles have been deposited on the photoconductive surface, in image configuration, they are transferred to a copy sheet 16 by transfer means 15, which can be pressure transfer or electrostatic transfer. Alternatively, the developed image can be transferred to an intermediate transfer member and subsequently transferred to a copy sheet.

After the transfer of the developed image is completed, copy sheet 16 advances to fusing station 19, depicted in FIG. 1 as fusing and pressure rolls, wherein the developed image is fused to copy sheet 16 by passing copy sheet 16 between the fusing member 5 and pressure member 6, thereby forming a permanent image. Photoreceptor 10, subsequent to transfer, advances to cleaning station 17, wherein any toner left on photoreceptor 10 is cleaned therefrom by use of a blade (as shown in FIG. 1), brush, or other cleaning apparatus.

Figure 2:
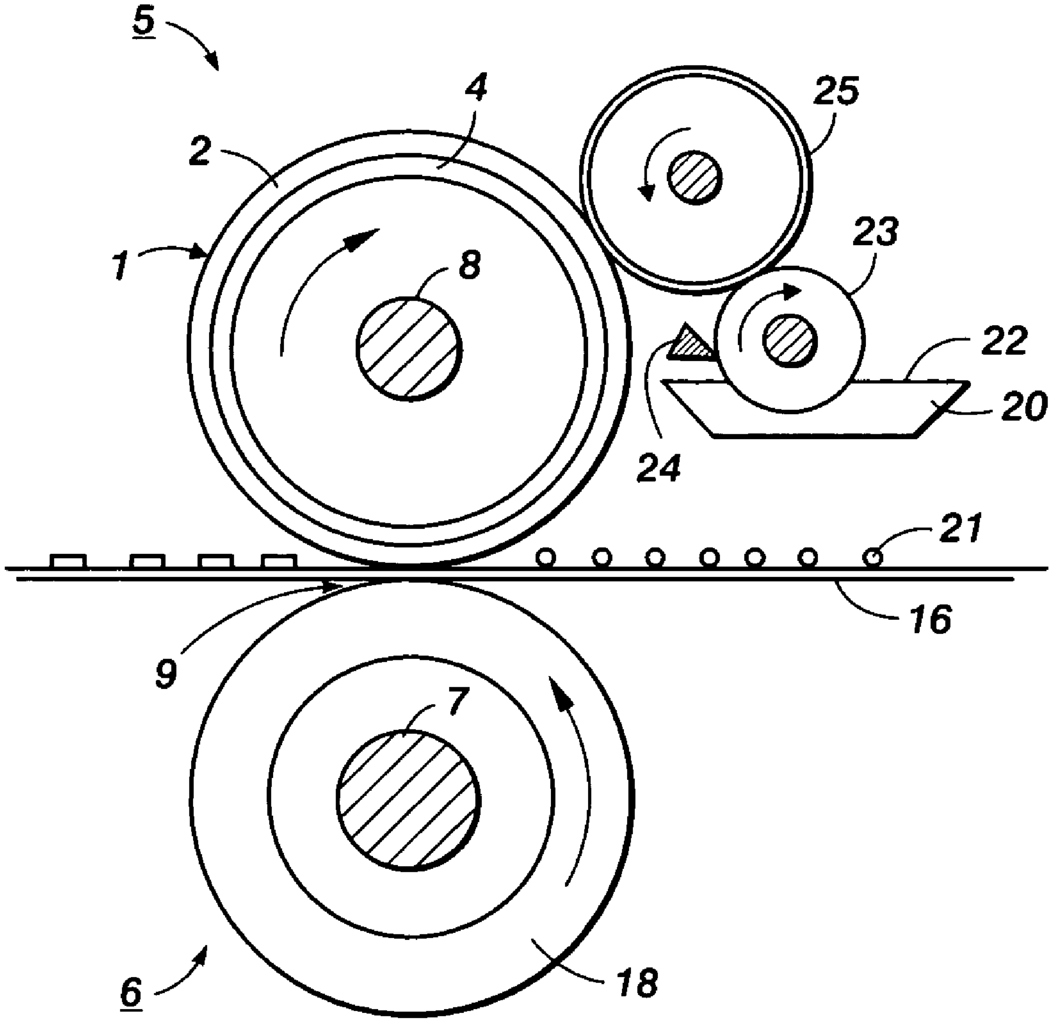
FIG. 2 is a sectional view of a fusing assembly in accordance with one embodiment disclosed herein.

In FIG. 2, fuser roller 5 can be a hollow cylinder or core fabricated from any suitable metal, such as aluminum, anodized aluminum, steel, nickel, copper, and the like, having a suitable heating element 8 disposed in the hollow portion thereof which is coextensive with the cylinder.

Backup or pressure roll 6 cooperates with fuser roll 5 to form a nip or contact arc 9 through which a copy paper or other substrate 16 passes such that toner images 21 thereon contact fluorocarbon surface 2 of fuser roll 5. As shown in FIG. 2, the backup roll 6 has a rigid steel core 7 with a fluorocarbon surface or layer 18 thereon. Sump 20 contains polymeric release agent 22 which may be a solid or liquid at room temperature, but it is a fluid at operating temperatures.

In the embodiment shown in FIG. 2 for applying the polymeric release agent 22 to fluorocarbon elastomer surface 2, two release agent delivery rolls 23 and 25 rotatably mounted in the direction indicated are provided to transport release agent 22 to fluorocarbon surface 2. Delivery roll 23 is partly immersed in the sump 20 and transports on its surface release agent from the sump to the delivery roll 23. By using a metering blade 24, a layer of polymeric release fluid can be applied initially to delivery roll 23 and subsequently to fluorocarbon elastomer 2 in controlled thickness ranging from submicrometer thickness to a thickness of several micrometers of release fluid. Thus, by metering device 24, about 0.1 to about 2 micrometers or greater thicknesses of release fluid can be applied to the surface of fluorocarbon elastomer 2. A web metering system that provides 0.05+/−0.01 microliters of release fluid may be used. It has been shown that low oil rates aggravate voltage potentials.

The fusing component of the present invention can be comprised of at least three different configurations. In one embodiment, the fusing component is of a two-layer configuration as shown in FIG. 2. Fuser member 5 comprises substrate 4. Positioned over the substrate 4 is outer fluorocarbon layer 2 having fusing surface 1.

Figure 3:
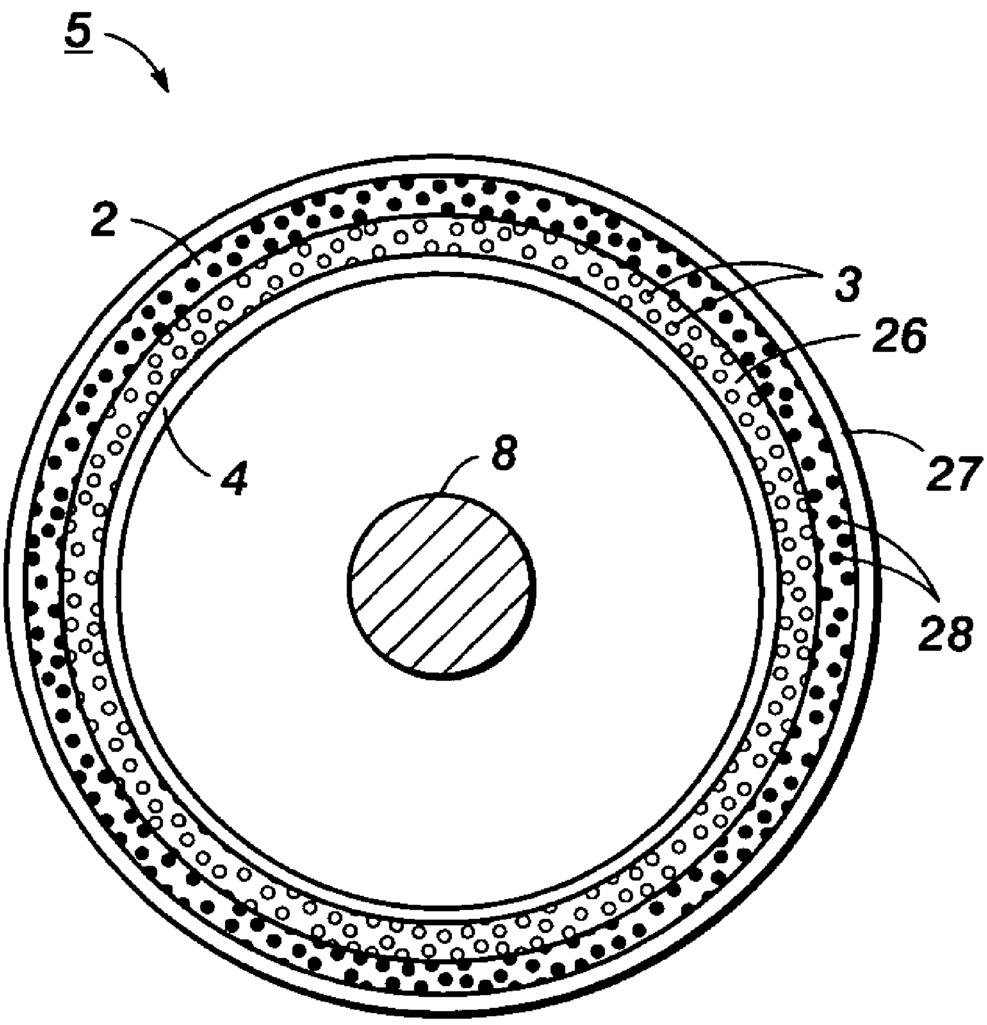
FIG. 3 is a sectional view of a fuser roller having a three-layer configuration.

FIG. 3 demonstrates a three-layer configuration, wherein fuser roller 5 has heating member 8 inside substrate 4 having intermediate layer 26 (which can be a silicone rubber) positioned on substrate 4, and outer layer 2 positioned on intermediate layer 26. FIG. 3 demonstrates optional fillers 3 and 28, which may be the same or different, and can be dispersed optionally in the intermediate layer 26, and/or optionally in the outer layer 2.

In embodiments, there may be present an outer release layer 27 positioned on the outer layer 2 as shown in FIG. 3.

Examples of suitable substrate materials include, in the case of roller substrate, metals such as aluminum, stainless steel, steel, nickel and the like. In the case of film-type substrates (in the event the substrate is a fuser belt, film, drelt (a cross between a drum and a belt) or the like) suitable substrates include high temperature plastics that are suitable for allowing a high operating temperature (i.e., greater than about 80° C., or greater than 200° C.), and capable of exhibiting high mechanical strength.

The outer layer comprises a fluorocarbon, and in embodiments, perfluoroalkoxy polytetrafluoroethylene (PFA PTFE, or PFA). The fluorocarbon is present in the outer layer in an amount of from about 75 to about 95, or from 80 to about 90 percent by weight of total solids.

An electrically conductive filler is dispersed or contained in the fluorocarbon outer layer. In embodiments, the fluorocarbon outer layer comprises fluorocarbon polymer of desired composition and carbon black in appropriate amounts with desired size and shape, resulting in a volume resistivity of from about $1\times10^{-4}$ to about $1\times10^{-8}$ ohms/square. Examples of suitable carbon fillers include non-graphite carbon blacks such as N330® from Cabot, Alpharetta, Ga.; KETJEN BLACK® from ARMAK Corp; VULCAN XC72, VULCAN® XC72, BLACK PEARLS® 2000, and REGAL® 250R available from Cabot Corporation Special Blacks Division; THERMAL BLACK® from RT Van Derbilt, Inc.; Shawinigan Acetylene Blacks available from Chevron Chemical Company; furnace blacks; ENSACO® Carbon Blacks and THERMAX Carbon Blacks available from R.T. Vanderbilt Company, Inc.; and those graphites available from Southwestern Graphite of Burnet, Tex., GRAPHITE 56-55 (10 microns, $10^{-1}$ ohm/sq), Graphite FP 428J from Graphite Sale, Graphite 2139, 2939 and 5535 from Superior Graphite, and Graphites M450 and HPM850 from Asburry. Other carbon blacks include fluorinated carbon black (for example, ACCUFLUOR® or CARBOFLUOR®), and the like, and mixtures thereof.

In embodiments, the carbon black filler is present in an amount of from about 1.0 to about 12, or from about 4 to about 10, or from about 5 to about 8 percent by weight of total solids.

The addition of the carbon black into the outer fluorocarbon layer allows for an aspect ratio of from about 1 to 1,000, or from about 5 to about 100, or from about 10 to about 50. The aspect ratio is defined as a ratio of dimension of the major axis to the primary minor axis.

The carbon black is present in the outer layer in an amount, shape, and or distribution so as to enable the volume resistivity of the outer layer to become from about $1\times10^{-4}$ to about $1\times10^{-8}$ ohms/square, or from about $1\times10^{-5}$ to about $1\times10^{-7}$ ohms/square.

The volume resistivity can be tailored by using a specific type of carbon black, a specific amount of carbon black, a carbon black with a certain particle geometry, orienting the carbon black within the polymer outer layer in a certain configuration, a carbon black with a specific resistivity, a carbon black with a specific chemistry, a carbon black with a specific surface area, carbon black with a specific size, and the like.

Graphite carbon black is defined as being of crystalline shape, or the crystalline allotropic form of carbon black, and non-graphite carbon black is a finely divided form of carbon black. In graphite, carbon atoms are located in a plane of symmetrical hexagons and there are layers and layers of these planes in graphite. Non-graphite carbon black, as used herein, refers to any carbon black, which is not of crystalline allotropic form. Non-graphite carbon black is formed by incomplete combustion of organic substances, such as hydrocarbons. Examples of non-graphite carbon blacks include furnace blacks, channel blacks, thermal blacks, lamp blacks, acetylene blacks, and the like. Structurally, non-graphite carbon blacks consist of bundles of parallel orientated graphite planes at a distance of between 3.5 to 3.8 angstroms.

Carbon blacks can have different geometries such as a particle shape of a sphere, crystalline, flake, platelet, fiber, whisker, or rectangular. In embodiments, the carbon black has a needle-like shape.

A relatively large carbon black can have a particle size of from about 1 micron to about 100 microns, or from about 2 to about 10 microns, or from about 5 to about 10 microns. A relatively small size carbon black has a particle size of from about 10 nanometers to about 1 micron, or from about 10 nanometers to about 100 nanometers, or from about 10 nanometers to about 80 nanometers. In embodiments, the carbon black used herein has a particle size of from 5 to 10 nanometers.

In an embodiment, the carbon black has a bulk resistivity of from about $10^{0}$ to about $10^{-4}$ ohms-cm.

In embodiments, more than one type of filler may be present in the fluorocarbon outer layer, and/or in any of the other substrate, adhesive or intermediate layer, and/or outer release layer. In embodiments, a carbon filler different than the first carbon black disclosed in the fluorocarbon outer layer, or a metal, ceramic, inorganic, metal oxide filler, and/or a polymer filler can be present in the fluorocarbon outer layer. In embodiments, metal, metal oxide or inorganic/ceramic filler is present in an amount of from about 0 to about 20, or from about 0 to about 10 volume percent of total solids. In embodiments, a polymer filler is present in an amount of from about 0 to about 50 percent, or from about 5 to about 40 volume percent of total solids.

The outer fluorocarbon layer can be coated on the substrate using any suitable known manner. Typical techniques for coating such materials on the reinforcing member include liquid and dry powder spray coating, dip coating, wire wound rod coating, fluidized bed coating, powder coating, electrostatic spraying, sonic spraying, blade coating, and the like. In an embodiment, the fluorocarbon layer is spray or flow coated to the substrate.

In an embodiment, the outer fluorocarbon layer may be modified by any known technique such as sanding, polishing, grinding, blasting, coating, or the like. In embodiments, the outer fluorocarbon layer has a surface roughness of from about 0.05 to about 1.5 micrometers.

The fusing component can be of any suitable configuration. Examples of suitable configurations include a sheet, a film, a web, a foil, a strip, a coil, a cylinder, a drum, a roller, an endless strip, a circular disc, a belt including an endless belt, an endless seamed flexible belt, an endless seamless flexible belt, an endless belt having a puzzle cut seam, and the like.

Optionally, any known and available suitable adhesive layer may be positioned between the fluorocarbon outer layer and the substrate, and/or between the outer fluorocarbon layer and the outer release layer. Examples of suitable adhesives include silanes such as amino silanes (such as, for example, A1100 from OSI Specialties, Friendly W. Va.), titanates, zirconates, aluminates, and the like, and mixtures thereof. In an embodiment, an adhesive in from about 0.001 to about 10 percent solution, can be wiped on the substrate. The adhesive layer can be coated on the substrate, or on the fluorocarbon outer layer, to a thickness of from about 2 to about 2,000 nanometers, or from about 2 to about 500 nanometers. The adhesive can be coated by any suitable, known technique, including spray coating or wiping.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims. Unless specifically recited in a claim, steps or components of claims should not be implied or imported from the specification or any other claims as to any particular order, number, position, size, shape, angle, color, or material.

The following Examples are intended to illustrate and not limit the scope herein. Parts and percentages are by weight unless otherwise indicated.

EXAMPLES

Example 1

The process involved in fabricating the fuser member includes molding, grinding, pre-heat/sealing of the base layer followed by application of the primer and top layer, sintering, and final polishing. A multilayer fuser member was prepared by bonding a silicone polymer base layer on to an aluminum core followed by depositing an outerlayer of electrically conducting fluoropolymer coating. The roll with the base layer fabricated by liquid injection molding a silicone compound onto an aluminum core was purchased from Ten Cate Enbi of Shelbyville, Ind. The silicone layer which was 0.28 mm thick, had thermal conductivity of about 0.5 W/mK (at 350° F.), surface roughness (Ra) of 3+/−1.5 um and a compression set of less than approximately 15 percent. The above roll was then cleaned by an aqueous wash followed by spraying of primer containing a 50:50 blend of silane (DC 6060 from Dow Corning) and polyamide resin (Versamid 100T60 available from Henkel Corporation) and prebaking in an IR oven for about 20 minutes. The conductive fluoropolymer material was obtained from DuPont for the coating and applied to the above silicone surface of the roll using standard spray coating equipment in two steps. A mid-coat formulation #855-101 and a top-coat a mid-coat formulation #855-103 both DuPont materials were then coated. A topcoat primer layer formulation # 855-023 available from DuPont was applied prior to coating of the mid-coat. The coating was then cured and dried for about 6 minutes at 650° F. to a dry thickness of about 1 mil.

Figure 4:
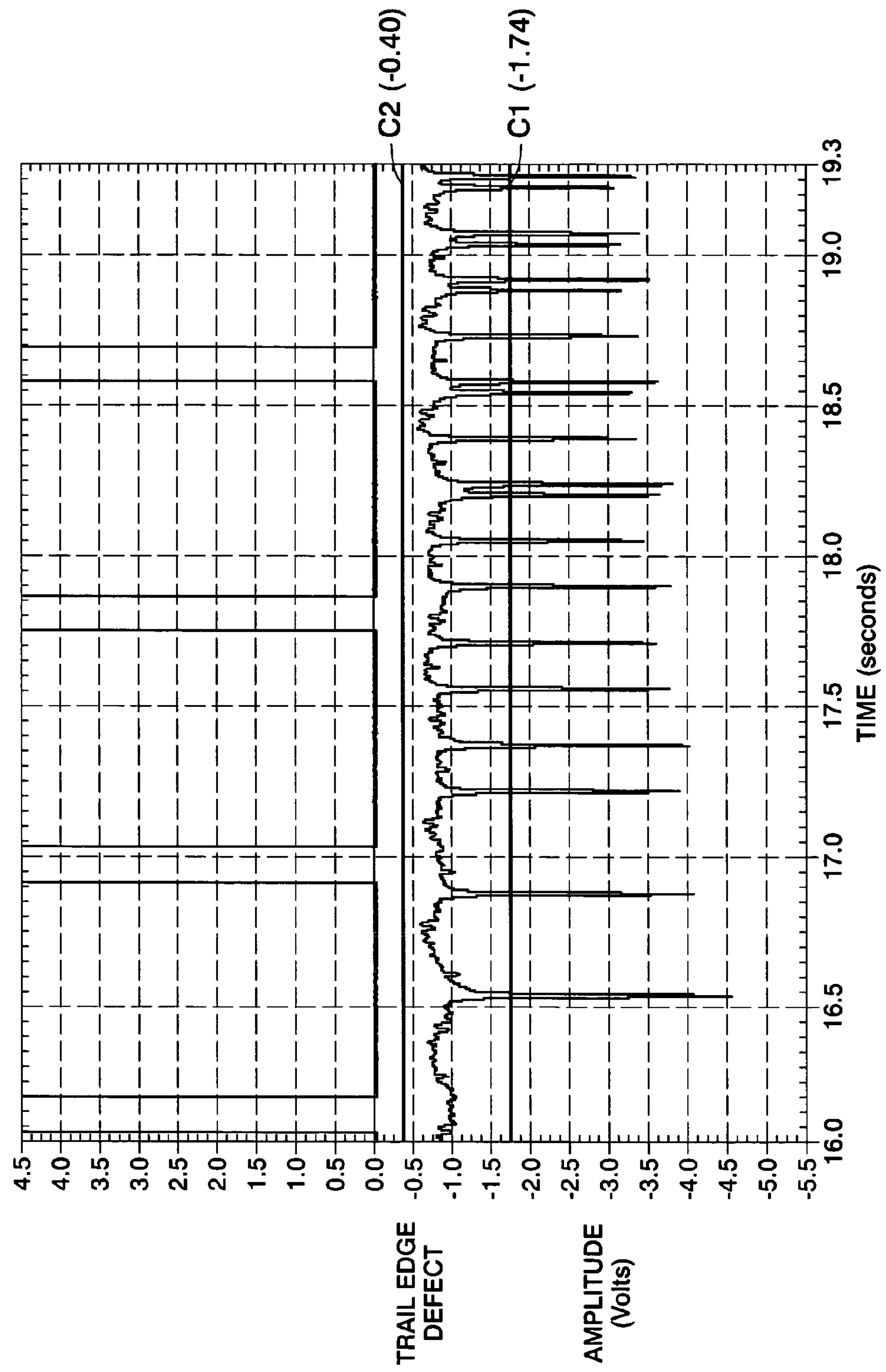
FIG. 4 is a graph of voltage versus roll position correlating to known print defects showing trail edge voltage defect.
Figure 5:
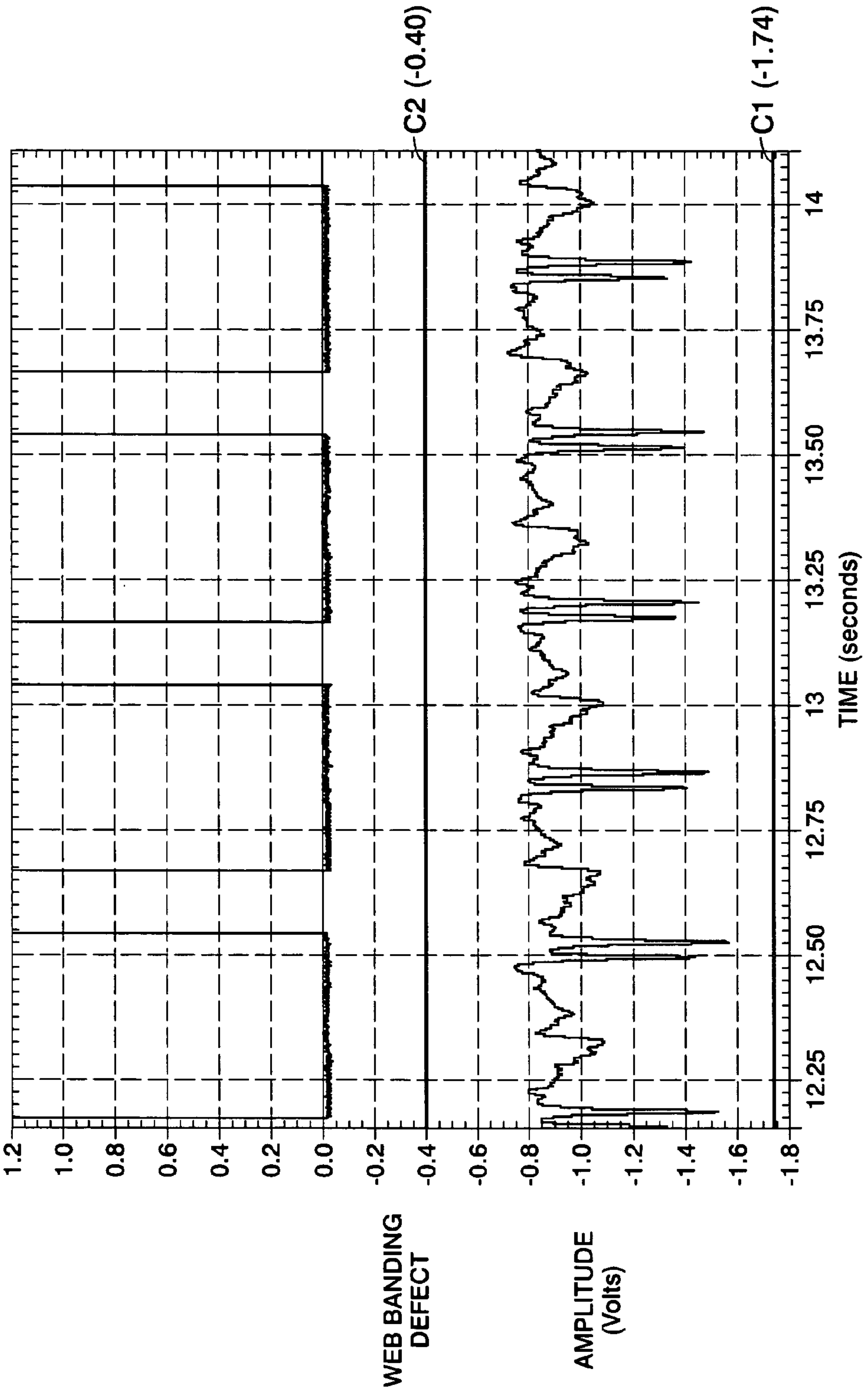
FIG. 5 is a graph of voltage versus roll position correlating to known print defects showing web banding defect.

The embodiment enables the elimination or reduction of charge voltage differentials as represented in FIGS. 4 and 5. The voltage differential is depleted in less than 1 roll revolution or less than a 200 millisecond time period. This is accomplished by creating a conductive discharge path between the entire roll surface and ground. The conductive discharge path is a low resistance (0 to infinite ohms) route that directs the unwanted voltage to a specified (ground) dissipation area. A top-coat conductivity of less than $10^{-7}$ is desired to reduce the voltage differential in the above mentioned time period. The grounding of the roll can be accomplished by a number of known methods in the art for example direct and indirect. The grounding of the roll was accomplished by direct contact of the fuser coating to the conductive pressure roll sleeve. The pressure roll sleeve was then subsequently grounded to the frame via a number of springs.

The voltage defects associated with the embodiment are related to both objects contacting the roll, namely stripping and temperature control devices, as well as differentials due to oiling devices, substrates and any charge-related component contacting the roller conductive surface. The charge examples in FIGS. 4 and 5 are examples of voltages that are eliminated by embodiments herein.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

What is claimed is:

1. A fuser member comprising a substrate, and thereover, an outer layer comprising perfluoroalkoxy polytetrafluoroethylene and a first carbon black filler having a bulk resistivity of from about $10^{0}$ to about $10^{-4}$ ohms-cm, wherein said outer layer has a resistivity, tailored according to a size and particle geometry of carbon black therein, to be from about $1\times10^{-4}$ to about $1\times10^{-8}$ ohms/square, wherein said perfluoroalkoxy polytetrafluoroethylene is present in the outer layer in an amount of from about 75 to about 95 percent by weight of total solids, and further wherein said first carbon black filler is present in said outer layer in an amount of from about 5 to about 8 percent by weight of total solids.

2. The fuser member of claim 1, wherein said resistivity is from about $1\times10^{-5}$ to about $1\times10^{-7}$ ohms/square.

3. The fuser member of claim 1, wherein said first carbon black has a particle size of from about 5 to about 10 nanometers.

4. The fuser member of claim 1, wherein said carbon black has a particle geometry selected from the group consisting of sphere, crystalline, flake, platelet, fiber, whisker, or rectangular.

5. The fuser member of claim 3, wherein said carbon black has a crystalline or needle-like shape.

6. The fuser member of claim 1, further comprising an intermediate layer positioned over the substrate.

7. The fuser member of claim 6, wherein said intermediate layer comprises a silicone rubber.

8. The fuser member of claim 1, further comprising a second filler, in addition to said first carbon black filler.

9. The fuser member of claim 8, said second filler is selected from the group consisting of carbon fillers other than said first carbon filler, metal fillers, ceramic fillers, metal oxide fillers, doped metal oxide fillers, polymers fillers, and mixtures thereof.

10. The fuser member of claim 9, wherein said second filler is an electrically conductive metal oxide.

11. The fuser member in accordance with claim 9, wherein said second filler is a metal selected from the group consisting of aluminum and steel.

12. The fuser member of claim 1, further comprising an outer release layer provided on said fluorocarbon outer layer.

13. The fuser member of claim 1, wherein said fluorocarbon outer layer has an aspect ratio of from about 1 to about 1,000.

14. The fuser member of claim 1, wherein a continuous conductive discharge path is created between said fluorocarbon outer layer and a continuous ground path.

15. A fuser member comprising a substrate, and thereover, an intermediate layer comprising silicone rubber, and an outer layer positioned on said intermediate layer, wherein said outer layer comprises perfluoroalkoxy polytetrafluoroethylene and carbon black filler, wherein said outer layer has a resistivity, tailored according to a size and particle geometry of the carbon black therein, to be from about $1\times10^{-4}$ to about $1\times10^{-8}$ ohms/square.

16. An image forming apparatus for forming images on a recording medium comprising a charge-retentive surface to receive an electrostatic latent image thereon; a development component to apply toner to the charge-retentive surface to develop an electrostatic latent image to form a developed image on the charge retentive surface; a transfer film component to transfer the developed image from the charge retentive surface to a copy substrate; and a fuser member and fuser member for fusing toner images to a surface of the copy substrate, wherein said fuser member comprises a substrate, and thereover, an outer layer comprising perfluoroalkoxy polytetrafluoroethylene and carbon black filler wherein said outer layer has a resistivity, tailored according to a size and particle geometry of the carbon black filler therein, to be from about $1\times10^{-4}$ to about $1\times10^{-8}$ ohms/square, and wherein said carbon black filler is present in said outer layer in an amount of from about 5 to about 8 percent by weight of total solids.

* * * * *